United States Patent
Yoshimura

(10) Patent No.: US 10,322,608 B2
(45) Date of Patent: Jun. 18, 2019

(54) TIRE

(71) Applicant: Sumitomo Rubber Industries, Ltd., Kobe-shi, Hyogo (JP)

(72) Inventor: Kozo Yoshimura, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 374 days.

(21) Appl. No.: 15/404,732

(22) Filed: Jan. 12, 2017

(65) Prior Publication Data

US 2017/0210175 A1 Jul. 27, 2017

(30) Foreign Application Priority Data

Jan. 26, 2016 (JP) ................................. 2016-012640

(51) Int. Cl.
*B60C 11/13* (2006.01)
*B60C 11/03* (2006.01)
*B60C 11/12* (2006.01)

(52) U.S. Cl.
CPC ...... *B60C 11/0309* (2013.01); *B60C 11/0304* (2013.01); *B60C 11/0306* (2013.01); *B60C 11/0311* (2013.01); *B60C 11/12* (2013.01); *B60C 11/1236* (2013.01); *B60C 11/1307* (2013.01); *B60C 11/1392* (2013.01);
(Continued)

(58) Field of Classification Search
CPC ............. B60C 11/1392; B60C 11/1311; B60C 11/0306; B60C 2011/0341; B60C 2011/0365; B60C 2011/0386; B60C 11/0304; B60C 11/1236; B60C 11/1307;
(Continued)

(56) References Cited

U.S. PATENT DOCUMENTS

2009/0266458 A1* 10/2009 Takahashi ........... B60C 11/0302
152/209.18
2010/0326577 A1* 12/2010 Iwai .................... B60C 11/0309
152/209.24
(Continued)

FOREIGN PATENT DOCUMENTS

| JP | 2002-59711 | * | 2/2002 | ......... B60C 11/1384 |
| JP | 2006-160055 | * | 12/2004 | ............ B60C 11/04 |
| JP | 2013-177114 A | | 9/2013 | |

*Primary Examiner* — Eric Hug
(74) *Attorney, Agent, or Firm* — Birch, Stewart, Kolasch & Birch, LLP

(57) ABSTRACT

A tire is provided in a first half-tread portion with a first shoulder main groove and a first shoulder land region 4D and a first middle land region 4B on the axially outside and axially inside thereof, respectively. The first shoulder land region 4D is divided into first shoulder blocks 7D each provided with a first shoulder chamfer portion 10 at the corner portion 10 between the ground contacting surface and the groove side wall of the first shoulder main groove 3C. Both ends of the first shoulder chamfer portion 10 terminate without being connected to the first shoulder transverse grooves 6D. The first middle land region 4B is provided at the corner 14 between its ground contacting surface and the groove side wall of the first shoulder main groove with first middle chamfer portions 15 each positioned in a part of the range between the adjacent first middle rug grooves 6B. The first middle chamfer portions 15 are disposed so as face the first shoulder chamfer portions 10.

11 Claims, 7 Drawing Sheets

(52) U.S. Cl.
CPC ......... *B60C 2011/0341* (2013.01); *B60C 2011/0365* (2013.01); *B60C 2011/0386* (2013.01); *B60C 2011/133* (2013.01)

(58) Field of Classification Search
CPC ....... B60C 2011/133; B60C 2011/0339; B60C 2011/0388; B60C 11/1384
USPC .................................. 152/209.16, 209.18
See application file for complete search history.

(56) References Cited

U.S. PATENT DOCUMENTS

| | | | |
|---|---|---|---|
| 2016/0152087 A1* | 6/2016 | Hayashi | B60C 11/1392 152/209.18 |
| 2016/0303919 A1* | 10/2016 | Yamaoka | B60C 11/0332 |
| 2017/0008346 A1* | 1/2017 | Kubo | B60C 11/0306 |
| 2017/0050470 A1* | 2/2017 | Kanematsu | B60C 11/0304 |
| 2017/0232800 A1* | 8/2017 | Kanematsu | B60C 11/04 152/209.18 |
| 2017/0253090 A1* | 9/2017 | Wakizono | B60C 11/04 |
| 2018/0015788 A1* | 1/2018 | Hayashi | B60C 11/03 |
| 2018/0015789 A1* | 1/2018 | Horiguchi | B60C 11/0008 |
| 2018/0154697 A1* | 6/2018 | Yamaoka | B60C 11/0306 |
| 2018/0170114 A1* | 6/2018 | Hayashi | B60C 11/03 |

* cited by examiner

TIRE

TECHNICAL FIELD

The present invention relates to a tire with improved on-snow performance.

BACKGROUND ART

Japanese Patent Application Publication No. 2013-177114 (Patent Literature 1) discloses a pneumatic tire, wherein the tread portion is provided with a land region defined between main grooves extending continuously in the tire circumferential direction, and the land region is provided with rug grooves extending from one of the main grooves and terminating within the land region, and transverse grooves extending across the entire width of the land region.

Further, the corner of the land region formed between the ground contacting surface of the land region and a groove side wall of the main groove is provided with chamfer portions. Both ends in the tire circumferential direction of the chamfer portion are connected to the adjacent rug groove and the adjacent transverse groove, respectively.

SUMMARY OF THE INVENTION

Each of the chamfer portions disclosed in the Patent Literature 1 has its both ends connected to the rug groove and the transverse groove, therefore it is unable to increase the axial component of the edges. Further, in the Patent Literature 1, the land region is not provided with additional chamfer portions at opposite positions to the chamfer portions. Thus, the chamfer portions disclosed in the Patent Literature 1 cannot increase the edge effect sufficiently, and accordingly, it is difficult to improve the on-snow performance.

The present invention was made in view of the above, and a primary object thereof is to provide a pneumatic tire capable of improving the on-snow performance.

According to the present invention, a tire comprises
a tread portion having a first half-tread portion located on one side of the tire equator in the tire axial direction and a second half-tread portion on the other side of the tire equator in the tire axial direction,
the first half-tread portion provided with
a first shoulder main groove extending continuously in the tire circumferential direction on its most tread-edge side,
a first shoulder land region formed axially outside the first shoulder main groove, and
a first middle land region formed axially inside the first shoulder main groove,
wherein
the first shoulder land region is circumferentially divided into first shoulder blocks by first shoulder transverse grooves extending from the first shoulder main groove to the adjacent tread edge,
each of the first shoulder blocks has a first shoulder chamfer portion at a corner between a ground contacting surface of the first shoulder block and a groove side wall of the first shoulder main groove,
both ends in the tire circumferential direction of the first shoulder chamfer portion terminate without being connected to the adjacent first shoulder transverse grooves,
the first middle land region is provided with
first middle rug grooves extending axially inwardly from the first shoulder main groove and terminating within the first middle land region, and first middle chamfer portions each formed at a corner between a ground contacting surface of the first middle land portion and the adjacent side wall of the first shoulder main groove in a part of the range between a pair of the adjacent first middle rug grooves, and the first middle chamfer portions are disposed so as to overlap in the tire circumferential direction with the first shoulder chamfer portions of the first shoulder blocks.

Further, the tire according the present invention may have the following features (1)-(6):
(1) the first middle land region is provided with first inside middle sipes extending axially inwardly from positions axially inside the first middle rug grooves, and
the first inside middle sipes are inclined to the same direction as the first middle rug grooves;
(2) the first middle land region is provided with first outside middle sipes extending axially inwardly from the first shoulder main groove, and each disposed between a pair of the first middle rug grooves adjacent in the tire circumferential direction, and further each connected to an end in the tire circumferential direction of one of the first middle chamfer portions;
(3) the first shoulder block is provided with a pair of first shoulder sipes extending axially outwardly from said both ends of the first shoulder chamfer portion;
(4) the second half-tread portion is provided with a second shoulder main groove extending continuously in the tire circumferential direction on its most tread-edge side, and a second shoulder land region located axially outside the second shoulder main groove,
the second shoulder land region is circumferentially divided into second shoulder blocks by second shoulder transverse grooves extending from the second shoulder main groove to a tread edge, and
each of the second shoulder blocks is provided with a second shoulder chamfer portion at a corner between a ground contacting surface of the second shoulder block and a groove side wall of the second shoulder main groove in a part of the range between a pair of the second shoulder transverse grooves adjacent in the tire circumferential direction;
(5) the second shoulder block is provided with a second shoulder sipe extending axially outwardly from the second shoulder main groove, and
the second chamfer portion extends in the tire circumferential direction from the second shoulder sipe to one of said pair of the second shoulder transverse grooves adjacent in the tire circumferential direction;
(6) the tread portion is provided with a tread pattern whose position when the tire is mounted on a vehicle is specified such that the first half-tread portion and the second half-tread portion are respectively located toward the inside and outside of the vehicle.

In the tire according to the present invention, the first half-tread portion located one side of the tire equator in the tire axial direction is provided with the first shoulder main groove extending continuously in the tire circumferential direction on its most tread-edge side, the first shoulder land region disposed axially outside the first shoulder main groove, and the first middle land region disposed axially inside the first shoulder main groove.

The first main groove configured as such compresses the snow into the groove and shears the compresses the snow, therefore, it is possible to improve on-snow performance.

The first shoulder land region is divided into the first shoulder blocks by the first shoulder transverse grooves extending from the first shoulder main groove to the tread edge. The first shoulder transverse grooves configured as such compress the snow into the grooves and shear the compressed snow, therefore, it is possible to improve the on-snow performance.

The first shoulder blocks each have the first shoulder chamfer portion at the corner between the ground contacting surface of the first shoulder block and the groove side wall of the first shoulder main groove. The first chamfer portion configured as such can increase the circumferential edge component, therefore, it is possible to improve the on-snow performance.

The both ends in the tire circumferential direction of the first shoulder chamfer potion terminate without being connected to the first shoulder transverse grooves. Thereby, an step surface extending in the tire axial direction is formed in the first shoulder transverse groove. Such step surface provides an axial edge component and can scratch the snow in the tire circumferential direction, therefore, it is possible to improve the on-snow performance.

The first middle land region is provided with the first middle rug grooves extending axially inwardly from the first shoulder main groove and terminating within the first middle land region, and the first middle chamfer portions each formed at the corner between the ground contacting surface of the first middle land region and the groove side wall of the first shoulder main groove in a part of the range between a pair of the first middle rug grooves adjacent in the tire circumferential direction.

The first middle rug groove compresses the snow into the groove and shears it, therefore, it is possible to improve the on-snow performance. Further, the first middle chamfer portion can increase the circumferential edge component and can improve the on-snow performance. Furthermore, since the first middle chamfer portion is formed in a part of the range between a pair of the first middle rug grooves, a step surface extending in the tire axial direction is formed. Such step surface provides an axial edge component and can scratch the snow in the tire circumferential direction, therefore, it is possible to improve the on-snow performance.

The first middle chamfer portions are disposed so as to face the first shoulder chamfer portions. Thereby, the first middle chamfer portions and the first shoulder chamfer portions contact with the ground at the same time, therefore it is possible to greatly increase the edge components and scratch the snow efficiently. Thus, the tire according to the present invention can improve the on-snow performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges (first tread edge 2At, second tread edge 2Bt) are the axial outermost edges of the ground contacting patch which occurs under the normally inflated loaded condition when the camber angle of the tire is zero.

The tread width TW is the width measured under the normally inflated unloaded condition, as the axial distance between the tread edges determined as above.

DESCRIPTION OF THE PREFERRED EMBODIMENTS

Embodiments of the present invention will now be described in detail in conjunction with accompanying drawings. The present invention can be applied to various tires, and suitably applied to a radial tire for passenger cars.

Figure 1:
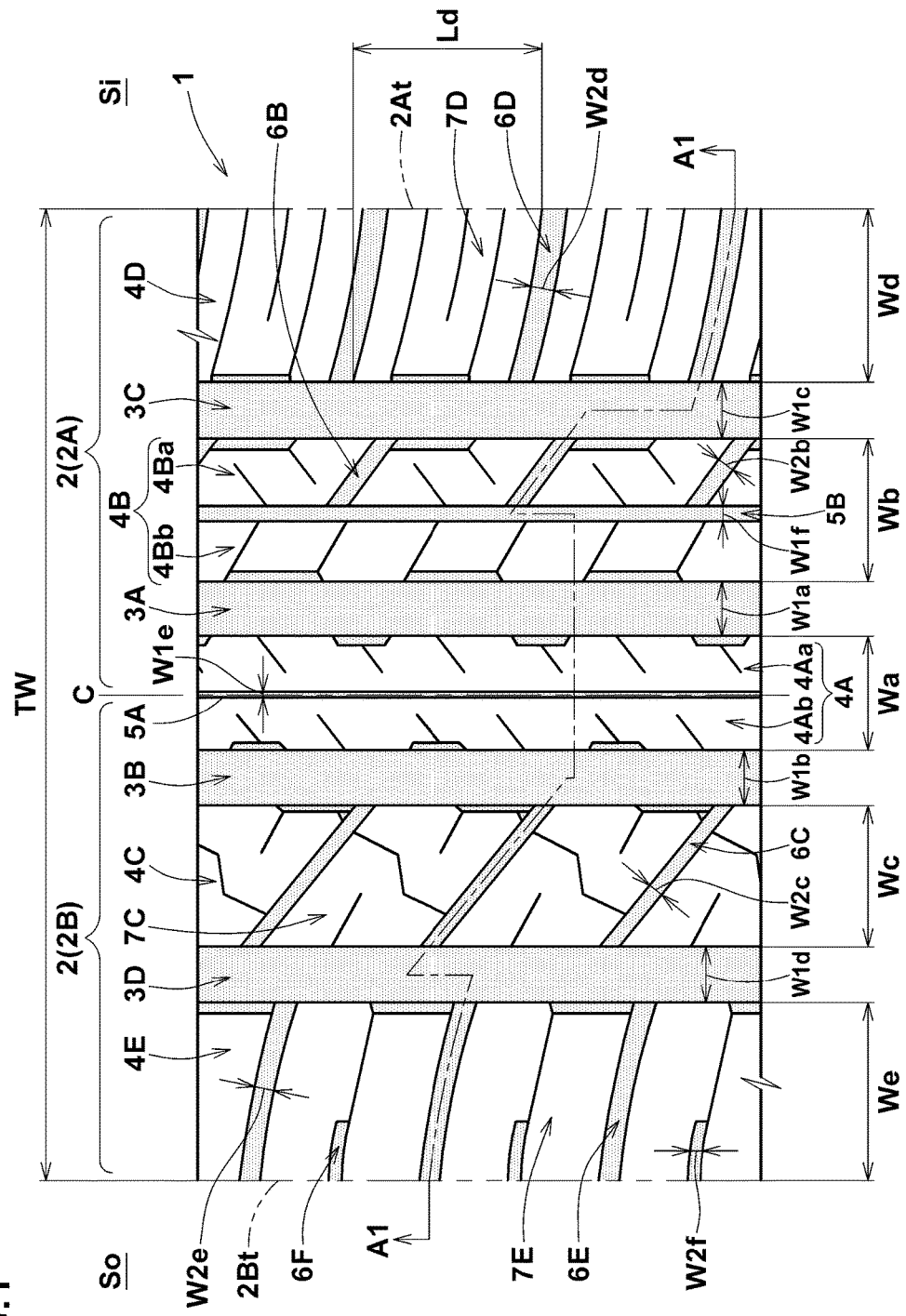
FIG. 1 is a developed view of the tread portion of a tire as an embodiment of the present invention.

FIG. 1 shows the tread portion 2 of a passenger car radial tire as an embodiment of the present invention.

The tread portion 2 in this embodiment has a left-right asymmetric tread pattern for which a mounting position on a vehicle is specified. The mounting position is indicated in a sidewall portion and the like of the tire 1 by characters ("INSIDE" and/or "OUTSIDE", for example) and so on (not shown in the figures).

The tread portion 2 has a first half-tread portion 2A located on one side of the tire equator C in the tire axial direction, and a second half-tread portion 2B located on the other side of the tire equator in the tire axial direction. When the tire is mounted on a vehicle, the first half-tread portion 2A is located toward the inside Si of the vehicle, and the second half-tread portion 2B is located toward the outside So of the vehicle.

The first half-tread portion 2A is provided with a first shoulder main groove 3C extending continuously in the tire circumferential direction on its most tread-edge 2At side (hereafter, also referred to as "first tread edge"), a first shoulder land region 4D disposed axially outside the first shoulder main groove 3C, and a first middle land region 4B disposed axially inside the first shoulder main groove 3C.

Further, the first half-tread portion 2A in this embodiment is provided with a first center main groove 3A extending continuously in the tire circumferential direction between the tire equator C and the first shoulder main groove 3C. In this embodiment, therefore, the first middle land region 4B is defined as being between the first shoulder main groove 3C and the first center main groove 3A.

The second half-tread portion 2B is provided with a second shoulder main groove 3D extending continuously in the tire circumferential direction on its most tread-edge 2Bt side (hereafter, also referred to as "second tread edge"), a second shoulder land region 4E disposed axially outside the second shoulder main groove 3D, and a second middle land region 4C disposed axially inside the second shoulder main groove 3D.

Further, the second half-tread portion 2B in this embodiment is provided with a second center main groove 3B extending continuously in the tire circumferential direction between the tire equator C and the second shoulder main groove 3D.

In this embodiment, therefore, the second middle land region 4C is defined as being between the second shoulder main groove 3D and the second center main groove 3B.

In this embodiment, the tread portion 2 is provided with a center land region 4A axially divided by the first center main groove 3A and the second center main groove 3B.

The center land region 4A is provided with a center sub groove 5A extending continuously in the tire circumferential direction on the tire equator C.

Thereby, the center land region 4A is composed of a first center land subsection 4Aa defined between the center sub groove 5A and the first center main groove 3A, and a second center land subsection 4Ab defined between the center sub groove 5A and the second center main groove 3B.

The first center land subsection 4Aa is located in the first half-tread portion 2A, and the second center land subsection 4Ab is located in the second half-tread portion 2B.

In general, the circumferential length of the ground contacting patch of a pneumatic tire under the normally-inflated normally-loaded state decreases from the tire equator toward the tread edges, and accordingly, the ground contact tends to decrease toward the axially outsides.

In this embodiment, in the ground contacting patch of the tire under the normally inflated normally loaded state, a maximum axial width Wa of the center land region 4A, a maximum axial width Wb of the first middle land region 4B, a maximum axial width Wc of the second middle land region 4C, a maximum axial width Wd of the first shoulder land region 4D, and a maximum axial width Wc of the second shoulder land region 4E are formed to satisfy the following relationship:

Wa<Wb<Wc<Wd<We.

Thereby, the tire in this embodiment can substantially equalize the ground contacting areas of the respective land regions 4A, 4B, 4C, 4D and 4E, and thus can improve the ground contact with the road surface, therefore, it is possible to improve the running performance on dry roads.

In order to exert such effects efficiently, it is preferred that the maximum axial width Wb of the first middle land region 4B and the maximum axial width Wc of the second middle land region 4C are 120% to 130% of the maximum axial width Wa of the center land region 4A.

Further, it is preferred that the maximum axial width Wd of the first shoulder land region 4D, and the maximum axial width We of the second shoulder land region 4E are 130% to 150% of the maximum axial width Wa of the center land region 4A.

The first shoulder main groove 3C and the second shoulder main groove 3D are formed as straight grooves extending straight along the tire circumferential direction.

The first shoulder main groove 3C and the second shoulder main groove 3D configured as such compress the snow thereinto to form snow blocks, and shear the snow blocks to obtain larger shearing force. Thereby, it is possible to improve the on-snow performance.

Further, the first shoulder main groove 3C and the second shoulder main groove 3D can guide the water film on the road surface toward the tire circumferential direction, therefore, it is possible to improve the wet performance.

The groove width W1c of the first shoulder main groove 3C and the groove width W1d of the second shoulder main groove 3D are set to be approximately 3% to 8% of the tread width TW.

Further, the groove depth D1c (shown in FIG. 2) of the first shoulder main groove 3C and the groove depth D1d (shown in FIG. 2) of the second shoulder main groove 3D are set to be approximately 3% to 7% of the tread width TW.

The first center main groove 3A and the second center main groove 3B are formed as straight grooves extending straight along the tire circumferential direction in the same way as the first shoulder main groove 3C and the second shoulder main groove 3D. The first center main groove 3A and the second center main groove 3B configured as such can improve the on-snow performance and the wet performance in the same way as the first shoulder main groove 3C and the second shoulder main groove 3D.

It is preferable that the groove width W1a of the first center main groove 3A and the groove width W1b of the second center main groove 3B are set to be in the same range as for the groove width W1c of the first shoulder main groove 3C and the groove width W1d of the second shoulder main groove 3D, namely, approximately 3% to 8% of the tread width TW.

Figure 2:
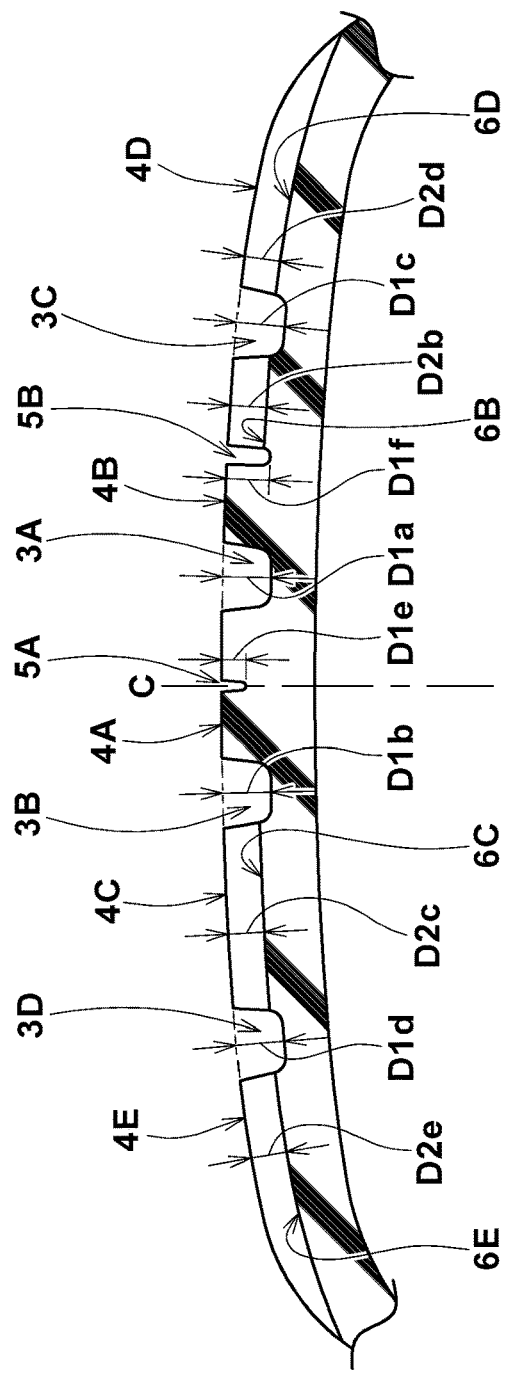
FIG. 2 is a schematic cross-sectional view of the tread portion (reinforcing cord layers therein are omitted) taken along line A1-A1 in FIG. 1.

Further, as shown in FIG. 2, it is preferable that the groove depth D1a of the first center main groove 3A and the groove depth D1b of the second center main groove 3B are set to be in the same range as for the groove depth D1c of the first shoulder main groove 3C and the groove depth D1d of the second shoulder main groove 3D, namely, approximately 3% to 7% of the tread width TW.

As shown in FIG. 1, the center sub groove 5A is formed as a straight groove extending straight along the tire circumferential direction. The center sub groove 5A configured as such can improve the on-snow performance and the wet performance in the same way as each of the main grooves 3A, 3B, 3C, and 3D.

The groove width W1e of the center sub groove 5A is smaller than the groove width W1a of the first center main groove 3A. Further, as shown in FIG. 2, the groove depth D1e of the center sub groove 5A is smaller than the groove depth D1a of the first center main groove 3A. The center sub groove 5A configured as such can prevent the decrease in the rigidity of the first center land subsection 4Aa, therefore, it is possible to maintain the running performance on dry roads.

In order to exert such effects efficiently, it is preferred that the groove width W1*e* of the center sub groove 5A is set in a range from 0.5% to 1.0% of the tread width TW as shown in FIG. 1. Further, it is preferred that the groove depth D1*e* (shown in FIG. 2) of the center sub groove 5A is set in a range from 1% to 2% of the tread width TW.

The first shoulder land region 4D is provided with the first shoulder transverse grooves 6D extending from the first shoulder main groove 3C to the first tread edge 2A*t*. Thereby, the first shoulder land region 4D is circumferentially divided into the first shoulder blocks 7D.

The first shoulder transverse grooves 6D configured as such compress the snow thereinto to form snow blocks, and shear the snow blocks to obtain larger shearing force. Thereby, it is possible to improve the snow performance.

Further, the first shoulder transverse grooves 6D can guide the water film on the road surface toward the first shoulder main groove 3C and the first tread edge 2A*t*. Therefore, it is possible to improve the wet performance.

The first shoulder transverse grooves 6D are inclined with respect to the tire axial direction. The edges of the first shoulder transverse grooves 6D configured as such can provide a circumferential component and an axial component in a good balance to improve the on-snow performance.

Moreover, the angle α2*d* of the first shoulder transverse groove 6D with respect to the tire circumferential direction is gradually increased from the first shoulder main groove 3C toward the first tread edge 2A*t* in order to drain the water film on the road surface smoothly.

In order to exert such effects efficiently, it is preferred that the groove width W2*d* of the first shoulder transverse groove 6D is set in a range from 2% to 5% of the tread width TW.

Further, as shown in FIG. 2, it is preferable that the maximum groove depth D2*d* of the first shoulder transverse groove 6D is set to be approximately 2.5% to 4.5% of the tread width TW. Furthermore, it is preferable that the angle α2*d* is set in a range from 70 to 90 degrees, for example.

The first shoulder blocks 7D are each configured so that the maximum length Ld thereof in the tire circumferential direction is substantially the same as the maximum width Wd thereof in the tire axial direction, and formed as a parallelogram in the plan view. The first shoulder block 7D configured as such can be increased in its rigidity in the tire circumferential direction and the tire axial direction in a good balance, therefore, it is possible to improve the running performance on snowy roads and dry roads.

Preferably, the maximum length Ld and the maximum width Wd of the first shoulder block 7D are approximately 15 to 20% of the tread width TW.

Figure 3:
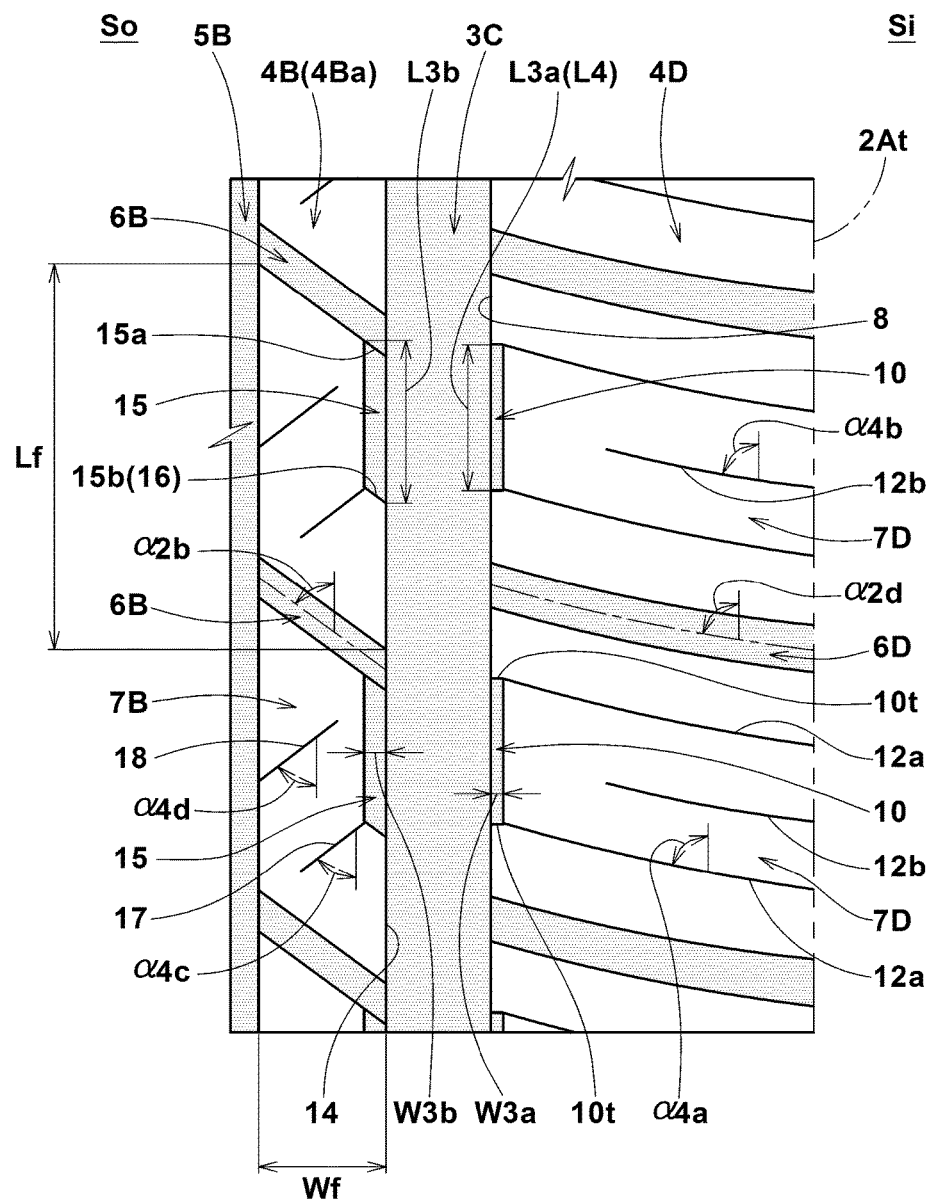
FIG. 3 is a magnified view of the first shoulder land region and the first middle land region.
Figure 4:
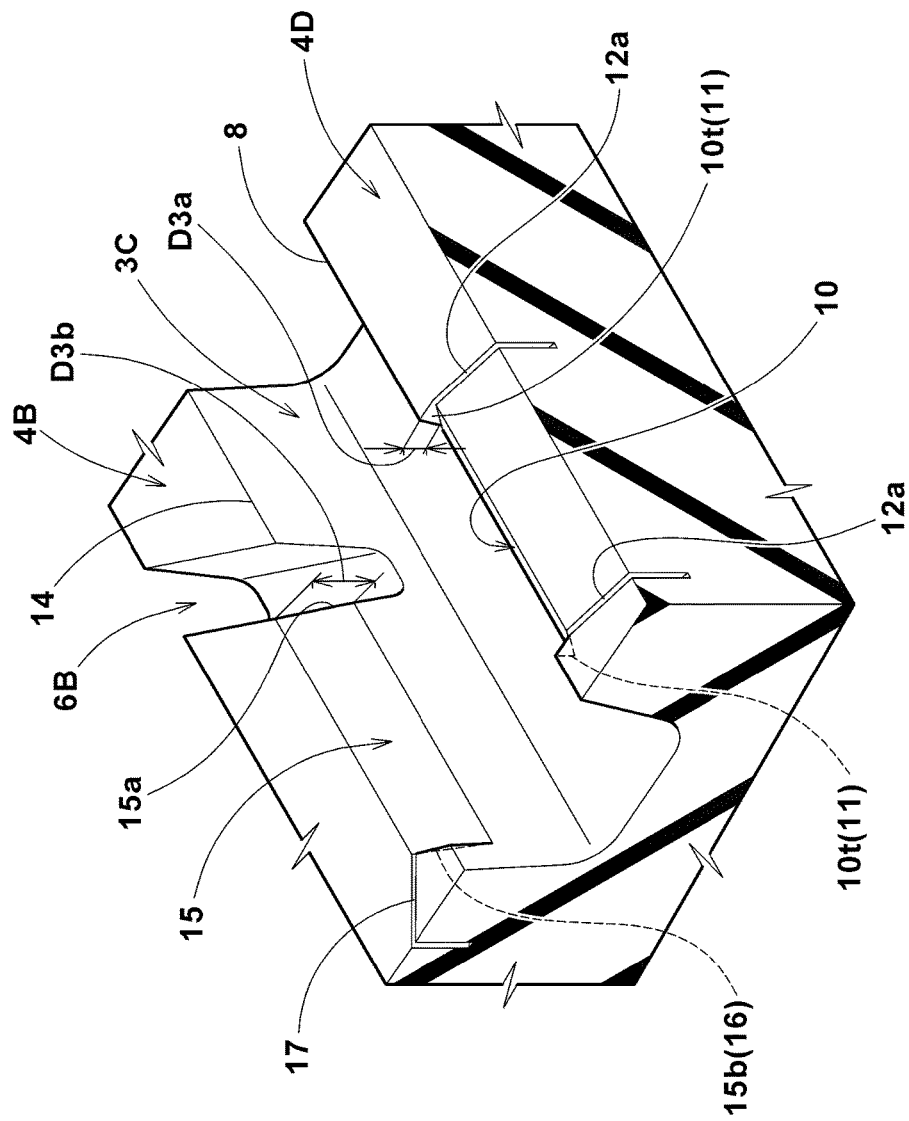
FIG. 4 is a perspective partial view showing the first shoulder chamfer portion and the first middle chamfer portion.

FIG. 3 shows the first shoulder land region 4D and the first middle land region 4B. FIG. 4 shows a first shoulder chamfer portion 10 and a first middle chamfer portion 15. Each of the first shoulder blocks 7D is provided with a first shoulder chamfer portion 10 at the corner 8 between the ground contacting surface of the first shoulder block 7D and a groove side wall of the first shoulder main groove 3C. The first shoulder chamfer portion 10 has a slope face as shown in FIGS. 3 and 4.

The first shoulder chamfer portion 10 configured as such can increase the circumferential component of the edges of the first shoulder block 7D to improve the on-snow performance.

Further, the first shoulder chamfer portion 10 can partially decrease the ground contacting area of the first shoulder block 7D, therefore, it is possible to improve the wet performance.

Both ends 10*t* in the tire circumferential direction of the first shoulder chamfer portion 10 terminate without being connected to the first shoulder transverse grooves 6D, and step surfaces 11 extending in the tire axial direction are formed at the ends 10*t*. The step surfaces 11 can provide an axial edge component to scratch the snow in the tire circumferential direction, therefore, it is possible to improve the on-snow performance.

Further, the step surfaces 11 in this embodiment are formed in the form of a triangle which is tapered toward the inside in the tire radial direction. Thereby, it is possible to suppress the decrease in the rigidity of the first shoulder block 7D, and to maintain the running performance on dry roads.

If the width W3*a* of the first shoulder chamfer portion 10 is small, sufficient edge components cannot be provided, and it becomes difficult to improve the on-snow performance.

Moreover, as the ground contacting area of the first shoulder block 7D cannot be decreased sufficiently to improve the wet performance.

If the width W3*a* of the first shoulder chamfer portion 10 is large, the first shoulder block 7D is decreased in the rigidity, and it becomes difficult to surely maintain the running performance on dry roads.

From these points of view, the width W3*a* of the first shoulder chamfer portion 10 is preferably not less than 0.8 mm, more preferably not less than 1.0 mm, and preferably not greater than 2.5 mm, more preferably not greater than 2.0 mm.

From similar points of view, a depth D3*a* (shown in FIG. 4) of the first shoulder chamfer portion 10 is preferably not less than 30%, more preferably not less than 40%, and preferably not greater than 60%, more preferably not greater than 50% of the groove depth D1*a* (shown in FIG. 2) of the first shoulder main groove 3C.

Further, the length L1*a* (shown in FIG. 3) in the tire circumferential direction of the first shoulder chamfer portion 10 is preferably not less than 40%, more preferably not less than 45%, and preferably not greater than 80%, more preferably not greater than 60% of the maximum length Ld (shown in FIG. 1) of the first shoulder block 7D.

The first shoulder block 7D is, as shown in FIG. 3, provided with a pair of first shoulder sipes 12*a* which respectively extend axially outwardly from the both ends 10*t* of the first shoulder chamfer portion 10. A pair of the first shoulder sipes 12*a* can increase the edges of the first shoulder block 7D, therefore, it is possible to improve the on-ice performance. Moreover, a pair of the first shoulder sipes 12*a* co-operates with the step surfaces 11 formed at the both ends 10*t* of the first shoulder chamfer portion 10 to provide the edges with an axial component, therefore, it is possible to improve the on-snow performance and the on-ice performance.

The first shoulder sipes 12*a* are each formed as an open sipe whose both ends are opened at the end 10*t* of the first shoulder chamfer portion 10 and the first tread edge 2A*t*. Thereby, the edges of the first shoulder sipes 12*a* are provided over a wide range in the tire axial direction of the first shoulder block 7D, therefore, it is possible to improve the on-ice performance.

The first shoulder sipes 12*a* are inclined with respect to the tire axial direction.

The angle α4a of the first shoulder sipe with respect to the tire circumferential direction is substantially in the same range as for the angle α2d of the first shoulder transverse grooves 6D.

The first shoulder sipes 12a configured as such can increase the circumferential component and axial component of the edges of the first shoulder block 7D, therefore, it is possible to improve the on-ice performance.

In order to exert these effects efficiently, the width of each of the first shoulder sipes 12a is preferably set in a range from 0.6 to 1.0 mm. Further, the depth of each of the first shoulder sipes 12a is preferably set in a range from 2.0 to 3.0 mm.

Further, each of the first shoulder blocks 7D is provided between the first shoulder sipes 12a with a first center shoulder sipe 12b extending in the tire axial direction. The first center shoulder sipe 12b configured as such can provide edges in a central portion in the tire circumferential direction of the first shoulder block 7D, therefore, it is possible to improve the on-ice performance.

The first center shoulder sipe 12b is a semi-open sipe extending axially inwardly from the first tread edge 2At and terminating without reaching the first shoulder chamfer portion 10 and the first shoulder main groove 3C. Thereby, the first center shoulder sipe 12b can suppress the decrease in the rigidity of the first shoulder block 7D to maintain the running performance on dry roads.

Further, the first center shoulder sipe 12b is inclined with respect to the tire axial direction.

The angle α4b of the first center shoulder sipe 12b with respect to the tire circumferential direction is in the same range as for the angle α2d of the first shoulder transverse groove 6D and the angle α4a of the first shoulder sipe 12a. The first center shoulder sipe configured as such can provide the first shoulder block 7D with a circumferential edge component and an axial edge component, therefore, it is possible to improve the on-ice performance.

It is preferable that the width of the first center shoulder sipe 12b is set in the same range as for the width of the first shoulder sipe 12a.

It is preferable that the depth of the first center shoulder sipe 12b is set in the same range as for the depth of the first shoulder sipe 12a.

As just described, owing to a pair of the first shoulder sipes 12a and the first center shoulder sipe 12b, the first shoulder block 7D can be provided with a large amount of the edges in comparison with the other land regions and blocks.

Further, when the tire 1 in this embodiment is mounted on a vehicle with a negative camber, the first shoulder blocks 7D located toward the inside Si of the vehicle are relatively increased in the ground contact pressure. Therefore, the first shoulder sipes 12a and the first center shoulder sipe 12b can scratch the ice effectively. Thus, it is possible to effectively improve the on-ice performance.

As shown in FIG. 1, the first middle land region 4B is provided in the widthwise center thereof with a first middle sub groove 5B extending continuously in the tire circumferential direction. Thereby, the first middle land region 4B is composed of an axially outer first middle land subsection 4Ba defined between the first middle sub groove 5B and the first shoulder main groove 3C, and an axially inner first middle land subsection 4Bb defined between the first middle sub groove 5B and the first center main groove 3A.

The first middle sub groove is formed as a straight groove extending straight along the tire circumferential direction. The first middle sub groove configured as such can improve the on-snow performance and the wet performance in the same way as the main grooves 3A, 3B, 3C and 3D.

The groove width W1f of the first middle sub groove 5B is smaller than the groove width W1a of the first center main groove 3A. Further as shown in FIG. 2, the groove depth D1f (shown in FIG. 2) of the first middle sub groove 5B is smaller than the groove depth D1a of the first center main groove 3A.

The first middle sub groove 5B configured as such can suppress the decrease in the rigidity of the first middle land region 4B, therefore, it is possible to maintain the running performance on dry roads.

In order to exert these effects efficiently, it is preferred that the groove width W1f of the first middle sub groove 5B is set in a range from 1.5% to 2.5% of the tread width TW. Further, it is preferable that the groove depth D1f (shown in FIG. 2) of the first middle sub groove 5B is set in a range from 1.5% to 3.0% of the tread width TW.

As shown in FIG. 3, the first middle land region 4B is provided with first middle rug grooves 6B extending axially inwardly from the first shoulder main groove 3C and terminating within the first middle land region 4B.

In this embodiment, the first middle rug groove 6B extends from the first shoulder main groove 3C to the first middle sub groove 5B. Thereby, the axially outer first middle land subsection 4Ba is circumferentially divided into axially outer first middle blocks 7B.

The first middle rug groove 6B configured as such can improve the on-snow performance and the wet performance in the same way as the first shoulder transverse groove 6D.

Moreover, the first middle rug groove 6B terminates within the first middle land region 4B, therefore, it is possible to suppress the decrease in the rigidity of the first middle land region 4B and to improve the running performance on dry roads.

In order to exert these effects efficiently, it is preferred that a groove width W2b (shown in FIG. 1) of the first middle rug groove 6B is set to be approximately 1.5% to 4% of the tread width TW for example. Further, it is preferable that the groove depth D2b (shown in FIG. 2) of the first middle rug groove 6B is set to be approximately 2.0% to 4.0% of the tread width TW (shown in FIG. 1) for example, In this embodiment, as shown in FIG. 3, the first middle rug groove 6B extends with an inclination with respect to the tire circumferential direction. The first middle rug groove 6B configured as such can provide both axial edge component and circumferential edge component in a good balance, therefore it is possible to improve the on-snow performance.

In order to exert these effects efficiently, it is preferred that an angle α2b of the first middle rug groove 6B with respect to the tire circumferential direction is set to be 45 to 65 degrees.

The above-mentioned axially outer first middle blocks 7B are each formed as a parallelogram in the plan view with its maximum length Lf in the tire circumferential direction is larger than its maximum width Wf in the tire axial direction. The axially outer first middle block 7B configured as such can relatively increase the block rigidity, therefore, it is possible to improve the running performance on snowy roads and dry roads.

Preferably, the maximum length Lf is set in a range from 15% to 25% of the tread width TW, and the maximum width Wf is set in a range from 5% to 10% of the tread width TW.

As shown in FIG. 3 and FIG. 4, the first middle land region 4B (in this embodiment, each of the axially outer first middle blocks 7B) is provided with the first middle chamfer portion 15 at the corner 14 between the ground contacting surface of the first middle land region 4B and the groove side wall of the first shoulder main groove 3C in a part of the range between the first middle rug grooves 6B adjacent in the tire circumferential direction. The first middle chamfer portion 15 has a slope face as shown in FIG. 4.

The first middle chamfer portion 15 configured as such can increase the circumferential edge component in the first middle land region 4B, therefore, it is possible to improve the on-snow performance. Further, the first middle chamfer portion 15 can partially decrease the ground contacting area of the first middle land region 4B, therefore, it is possible to improve the wet performance.

The first middle chamfer portion 15 is formed in a part of the range between the first middle rug grooves 6B, therefore, a step surface 16 extending in the tire axial direction is formed.

In this embodiment, one end 15a in the tire circumferential direction of the first middle chamfer portion 15 is connected to the first middle rug groove 6B located on the side of the above-mentioned one end 15a. on the other hand, the other end 15b in the tire circumferential direction of the first middle chamfer portion 15 terminates without reaching the first middle rug groove 6B located on the side of the other end 15b. Therefore, the step surface 16 in this embodiment is formed on the other end 15b of the first middle chamfer portion 15.

The step surface configured as such can provide an axial edge component and scratch the snow in the tire circumferential direction, therefore, it is possible to improve the on-snow performance.

Further, the step surface 16 in this embodiment is formed as a triangle tapered toward the radially inside. Thereby, it is possible to suppress the decrease in the rigidity of the axially outer first middle block 7B and to maintain the running performance on dry roads.

The above-mentioned one end 15a of the first middle chamfer portion 15 is connected to the first middle rug groove 6B, therefore, it is possible to decrease the ground contacting area of the first middle land region 4B on the side of the first middle rug groove 6B. Thereby, the first middle chamfer portion 15 can improve the wet performance compared with the case where it terminates without reaching the first middle rug groove 6B.

Further, the other end 15b of the first middle chamfer portion 15 is formed as a tapered shape in the plan view as shown in FIG. 3. The first middle chamfer portion 15 configured as such can alleviate the rigidity change from the corner 14 formed on the side of the other end of the first middle chamfer portion 15, therefore, it is possible to suppress the decrease in the steering stability.

In this embodiment, the width W3b (shown in FIG. 3) and depth D3b (shown in FIG. 4) of the first middle chamfer portion 15 are respectively set to be larger than the width W3a and depth D3a of the first shoulder chamfer portion 10. Thereby, the first middle chamfer portion 15 can scratch more amount of snow than the first shoulder chamfer portion 10 in an outer side (So) of the vehicle, therefore, it is possible to improve the on-snow performance.

In order to exert these effects efficiently, it is preferred that the width W3b of the first middle chamfer portion 15 is set in a range from 1.2 to 2.5 times the width W3a of the first shoulder chamfer portion 10.

Similarly, it is preferred that the depth D3b of the first middle chamfer portion 15 is set in a range from 1.2 to 2.5 times the depth D3a of the first shoulder chamfer portion 10.

In order to improve the on-snow performance by the first middle chamfer portion 15, the length L3b (shown in FIG. 3) in the tire circumferential direction of the first middle chamfer portion 15 is preferably not less than 35%, more preferably not less than 40%, and preferably not greater than 60%, more preferably not greater than 50% of the maximum length Lf of the axially outer first middle block 7B.

The first middle chamfer portions 15 are provided at opposite positions to the first shoulder chamfer portions 10. Thereby, the first middle chamfer portion 15 and the first shoulder chamfer portion 10 contact with the ground at the same time, therefore, the tire 1 in this embodiment can scratch the snow effectively. As a result, the tire 1 can be improved in the on-snow performance.

In a case where the tire 1 is mounted on a vehicle with a negative camber and the first half-tread portion 2A is located toward the inside Si of the vehicle as in this embodiment, the ground contact pressure of the first middle land region 4B and the first shoulder land region 4D becomes relatively high.

The first middle chamfer portion 15 and the first shoulder chamfer portion 10 provided in the land regions 4B and 4D with the large ground contact pressure as described above can scratch the snow efficiently, and therefore can greatly improve the on-snow performance.

In order to exert the above-described effects efficiently, it is preferred that the circumferential length L4 of an overlap in the tire circumferential direction between the opposite first middle chamfer portion 15 and first shoulder chamfer portion 10 is at least 60% of the length L3b in the tire circumferential direction of the first middle chamfer portion 15 as shown in FIG. 3. If the overlapping length L4 is less than 60% of the length L3b, the above-mentioned effects cannot be sufficiently exerted.

Preferably, the overlapping length L4 is not less than 80%, more preferably 100% of the length L3b of the first middle chamfer portion 15.

In this embodiment, the axially outer first middle block 7B (the first middle land region 4B) is provided between a pair of the circumferentially adjacent first middle rug grooves 6B with the first outside middle sipe 17 extending axially inwardly from the first shoulder main groove 3C (the first middle chamfer portion 15). The first outside middle sipe 17 configured as such can provide the edges to the axially outer first middle block 7B, therefore, it is possible to improve the on-ice performance.

Further, the first outside middle sipe 17 is formed as a semi-open sipe connected only with the first shoulder main groove 3C (the first middle chamfer portion 15). The first outside middle sipe 17 configured as such can suppress the decrease in the rigidity of the axially outer first middle block 7B and maintain the running performance on dry roads.

In this embodiment, the first outside middle sipe 17 extends with an inclination with respect to the tire axial direction. The first outside middle sipe configured as such can provide a circumferential edge component and a axial edge component for the axially outer first middle block 7B, therefore, it is possible to improve the on-ice performance.

Moreover, the first outside middle sipe 17 is inclined to the opposite direction to the first middle rug groove 6B. Thereby, the first outside middle sipe 17 can provide a circumferential edge component and a axial edge component differently from those provided by the first middle rug groove 6B, therefore, it is possible to further improve the on-ice performance.

As shown in FIG. 3 and FIG. 4, the first outside middle sipe 17 is connected to an end in the tire circumferential direction (the above-mentioned other end 15b in this embodiment) of the first middle chamfer portion 15. The first outside middle sipe 17 configured as such co-operates with the step surface 16 formed at the other end 15b of the first shoulder chamfer portion 10 and can provide the edges, therefore, it is possible to improve the on-snow performance and the on-ice performance.

In order to exert these effects efficiently, it is preferred that the width and depth of the first outside middle sipe 17 is set in the same range as for the width and depth of the first shoulder sipe 12a, respectively. Further, it is preferable that the angle α4c of the first outside middle sipe 17 with respect to the tire circumferential direction is set in a range from 40 to 60 degrees.

In this embodiment, the outside middle block 7B is provided between a pair of the circumferentially adjacent first middle rug grooves 6B with a first center middle sipe 18 extending axially outwardly from the first middle sub groove 5B. The first center middle sipe 18 configured as such can provide the edges for the axially outer first middle block 7B, therefore, it is possible to improve the on-ice performance.

Further, the first center middle sipe 18 in this embodiment is formed as a semi-open sipe connected only with the first middle sub groove 5B.

Moreover, the first center middle sipe 18 is connected to the first middle sub groove 5B in the central portion in the tire circumferential direction between a pair of the first middle rug grooves 6B adjacent in the tire circumferential direction. Thereby, the first center middle sipe 18 can suppress the decrease in the rigidity of the axially outer first middle block 7B, therefore, it is possible to maintain the running performance on dry roads.

In this embodiment, the first center middle sipe 18 extends with an inclination with respect to the tire axial direction. The first center middle sipe 18 configured as such can provide a circumferential edge component and an axial edge component for the axially outer first middle block 7B.

Moreover, the first center middle sipe 18 is inclined to the same direction as the first outside middle sipe 17.

Therefore, the first center middle sipe 18 co-operates with the first outside middle sipe 17 to provide different edge components from those provided by the first middle rug groove 6B.

In order to exert these effects efficiently, it is preferred that the width and the depth of the first center middle sipe 18 are set in the same range as for the width and the depth of the first shoulder sipe 12a, respectively.

Further, it is preferable that an angle α4d of the first center middle sipe 18 with respect to the tire circumferential direction is set in the same range as for the angle α4c of the first outside middle sipe 17.

Figure 5:
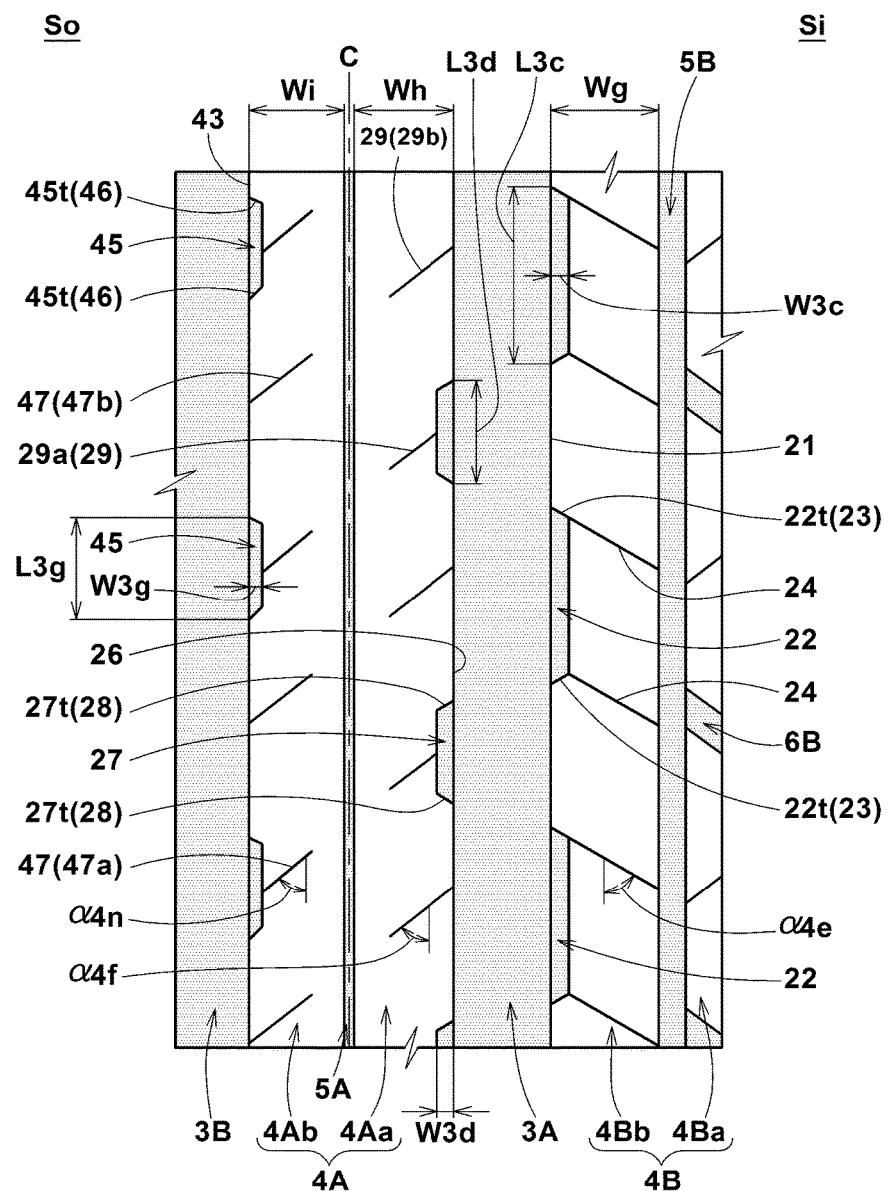
FIG. 5 is a magnified view of a first middle land subsection and a center land region.

FIG. 5 shows the axially inner first middle land subsection 4Bb and the center land region 4A. In this embodiment, the axially inner first middle land subsection 4Bb between the first center main groove 3A and the first middle sub groove 5B is formed as a rib body extending continuously in the tire circumferential direction.

Here, the term "continuous" regarding the rib body means that the rib body is not divided in the tire circumferential direction by a transverse groove, and a sipe is not included in the above-mentioned transverse groove.

The axially inner first middle land subsection 4Bb configured as such can increase the rigidity in the tire circumferential direction and the tire axial direction compared with a row of blocks completely divided from each other by transverse grooves.

Preferably, the maximum width Wg of the axially inner first middle land subsection 4Bb is set to be approximately 5.5% to 7.5% of the tread width TW.

The axially inner first middle land subsection 4Bb is provided with a first inside middle chamfer portion 22 at the corner 21 between the ground contacting surface of the axially inner first middle land subsection 4Bb and a groove side wall of the first center main groove 3A. The first inside middle chamfer portion 22 has a slope face as with the first shoulder chamfer portion 10 shown in FIG. 4.

In this embodiment, the first inside middle chamfer portions 22 are provided and arranged in the tire circumferential direction with substantially the same pitches as in the first middle chamfer portion 15 (shown in FIG. 3).

The first inside middle chamfer portion 22 configured as such can increase the circumferential edge component in the axially inner first middle land subsection 4Bb, therefore, it is possible to improve the on-snow performance.

Further, the first inside middle chamfer portion 22 can partially decrease the ground contacting area of the axially inner first middle land subsection 4Bb, therefore, it is possible to improve the wet performance.

Both ends 22t in the tire circumferential direction of the first inside middle chamfer portion 22 terminate within the axially inner first middle land subsection 4Bb. Thereby, step surfaces 23 extending in the tire axial direction are formed at the both ends 22tt of the first inside middle chamfer portion 22. The step surfaces 23, 23 configured as such can provide the axial edge component and scratch the snow in the tire circumferential direction, therefore, it is possible to improve the on-snow performance.

Further, the step surfaces 23 in this embodiment are formed as triangles tapered toward the inside in the tire radial direction as with the step surfaces 11 shown in FIG. 4. Thereby, it is possible to suppress the decrease in the rigidity of the first inside middle chamfer portion 22 and maintain the running performance on dry roads.

The both ends 22t of the first inside middle chamfer portion 22 are formed as a tapered shape in the plan view. The first middle chamfer portion 22 configured as such can alleviate a stepped rigidity change from the non-chamfered corner 21 on both sides of the first inside middle chamfer portion 22 in the tire circumferential direction, therefore, it is possible to prevent the decrease in the steering stability.

Preferably, the width W3c, depth and length L3c of the first inside middle chamfer portion 22 in this embodiment are set in the same ranges as for the width L3b, depth D3b and length L3b of the first middle chamfer portion 15, respectively.

The first middle land region 4B (the axially inner first middle land subsection 4Bb in this embodiment) is provided with first inside middle sipes 24 extending axially inwardly from a position axially inside the first middle rug groove 6B. The first inside middle sipe 24 configured as such can provide the first middle land portion 4B (the first inside middle land portion 4Bb) with the edges, therefore, it is possible to improve the on-ice performance.

Further, the first inside middle sipe 24 is formed as an open sipe extending between the first center main groove 3A (the first inside middle chamfer portion 22) and the first middle sub groove 5B. Thereby, the first inside middle sipe 24 can provide the edges over the entire range of the axially inner first middle land subsection 4B, therefore, it is possible to improve the on-ice performance.

The first inside middle sipe 24 is inclined with respect to the tire circumferential direction to the same direction as the first middle rug groove 6B. The first inside middle sipe 24 co-operates with the first middle rug groove 6B to provide an axial edge component and a circumferential edge component in a good balance, thereby, it is possible to improve the on-snow performance and the on-ice performance.

In this embodiment, the first inside middle sipe 24 extends axially outwardly from each end 22t of the first inside middle chamfer portion 22. Thereby, the first inside middle sipes 24 co-operate with the respective step surface 23 formed at the both ends 22t of the first inside middle chamfer portion 22, and can provide the axial edge component, therefore, it is possible to improve the on-snow performance and the on-ice performance.

In order to exert these effects effectively, it is preferred that the width and the depth of the first inside middle sipe 24 are set in the same range as for the width and the depth of the first shoulder sipe 12a, respectively.

Further, it is preferable that an angle α4e of the first inside middle sipe 24 with respect to the tire circumferential direction is set in the same range as for the angle α2b (shown in FIG. 3) of the first middle rug groove 6B with respect to the tire circumferential direction.

The first center land subsection 4Aa between the first center main groove 3A and the center sub groove 5A is applied by a relatively large load during straight running. Thus, the first center land subsection 4Aa is formed as a rib body extending continuously in the tire circumferential direction to ensure a high rigidity, therefore, it is possible to improve the steering stability on dry roads.

Preferably, the maximum width Wh of the first center land subsection 4Aa is set to be approximately 5.0% to 6.5% of the tread width TW.

In this embodiment, the first center land subsection 4Aa is provided with a first center chamfer portion 27 at the corner 26 between the ground contacting surface of the first center land subsection 4Aa and a groove side wall of the first center main groove 3A. The first center chamfer portion 27 has a slope face as with the first shoulder chamfer portion 10 shown in FIG. 4.

In this embodiment, the first center chamfer portions 27 are provided and arranged in the tire circumferential direction with substantially the same pitches as in the first inside middle chamfer portion 22.

The first center chamfer portion 27 configured as such can increase the circumferential edge component in the first center land subsection 4Aa, therefore, it is possible to improve the on-snow performance. Further, the first center chamfer portion 27 can partially decrease the ground contact area of the first center land subsection 4Aa, therefore, it is possible to improve the wet performance.

Both ends 27t in the tire circumferential direction of the first center chamfer portion 27 terminate within the first center land subsection 4Aa. Thereby, a step surface 28 extending in the tire axial direction is formed at each end 27t.

The step surface configured as such can provide the axial edge component and scratch the snow in the tire circumferential direction, therefore, it is possible to improve the on-snow performance.

Further, the step surface 28 in this embodiment is formed as a triangle tapered toward the inside in the tire radial direction as with the step surface 11 shown in FIG. 4. Owing to the ends 27t of the tapered shape, the first chamfer portion 27 can alleviate a stepped rigidity change from the corner portion 26 on both sides of the first center chamfer portion 27, therefore, it is possible to prevent the decrease in the steering stability.

Preferably, the width W3d and the depth of the first center chamfer portion 27 in this embodiment are set in the same ranges as for the width W3b and the depth D3b of the first middle chamfer portion 15, respectively.

The length L3d in the tire circumferential direction of the first center chamfer portion 27 is set to be smaller than the length L3a of the first shoulder chamfer portion 10, the length L3b of the first middle chamfer portion 15, and the length L3c of the first inside middle chamfer portion 22. Thereby, the first center chamfer portion 27 can suppress the decrease in the rigidity of the center land region 4A to which region relatively large ground contact pressure is applied during straight running, therefore, it is possible to improve the steering stability on dry roads.

Preferably, the length L3a of the first center chamfer portion 27 is set in a range from 50% to 80% of the length L3a of the first shoulder chamfer portion 10.

The first center chamfer portions 27 are shifted in the tire circumferential direction from the first inside middle chamfer portions 22 so that the first center chamfer portions 27 do not overlap with first inside middle chamfer portions 22. Thereby, the first center chamfer portion 27 and the first inside middle chamfer portion 22 can provide the edge components thoroughly in the tire circumferential direction on both sides of the first center main groove 3A.

In this embodiment, the first center land subsection 4Aa is provided with first center sipes 29 extending axially inwardly from the first center main groove 3A.

The first center sipe 29 configured as such can provide edges for the first center land subsection 4Aa, therefore, it is possible to improve the on-ice performance.

Further, the first center sipe 29 is formed as a semi-open sipe connected only with the first center main groove 3A. Thereby, the first center sipe 29 can suppress the decrease in the rigidity of the first center land subsection 4Aa, therefore, it is possible to maintain the steering stability on dry roads.

The first center sipe 29 in this embodiment extends with an inclination with respect to the tire axial direction. The first center sipe 29 configured as such can provide a circumferential edge component and an axial edge component for the first center land subsection 4Aa.

Moreover, the first center sipe 29 is inclined to the opposite direction to the first inside middle sipes 24 adjacent thereto with the first center main groove 3A therebetween. Thereby, the first center sipe 29 can provide the axial and circumferential edge components differently from those provided by the first inside middle sipe 24, therefore, it is possible to improve the on-ice performance.

The first center sipes 29 in this embodiment include first center short sipes 29a and first center long sipes 29b which are arranged alternately in the tire circumferential direction, wherein the first center short sipes 29a are respectively connected to the first center chamfer portions 27, and the first center long sipes 29b are respectively connected to non-chamfered portions of the first center main groove 3A formed between the first center chamfer portions 27.

The first center short sipe 29a and the first center long sipe 29b configured as such can provide the edges for the first center land subsection 4Aa thoroughly in the tire circumferential direction, therefore, it is possible to greatly improve the on-ice performance.

In order to exert these effects efficiently, it is preferred that the width and depth of the first center sipe 29 (the first center short sipe 29a and the first center long sipe 29b) are set in the same range as for the width and depth of the first shoulder sipe 12a.

Further, it is preferable that an angle α4f of the first center sipe 29 with respect to the tire circumferential direction is set to be approximately 40 to 60 degrees.

As shown in FIG. 1, the above-mentioned second shoulder land region 4E is provided with second shoulder transverse grooves 6E extending from the second shoulder main groove 3D to the second tread edge 2Bt. Thereby, the second shoulder land region 4E is circumferentially divided into second shoulder blocks 7E. The second shoulder transverse grooves 6E configured as such can improve the on-snow performance and the wet performance in the same manner as the first shoulder transverse groove 6D.

Figure 6:
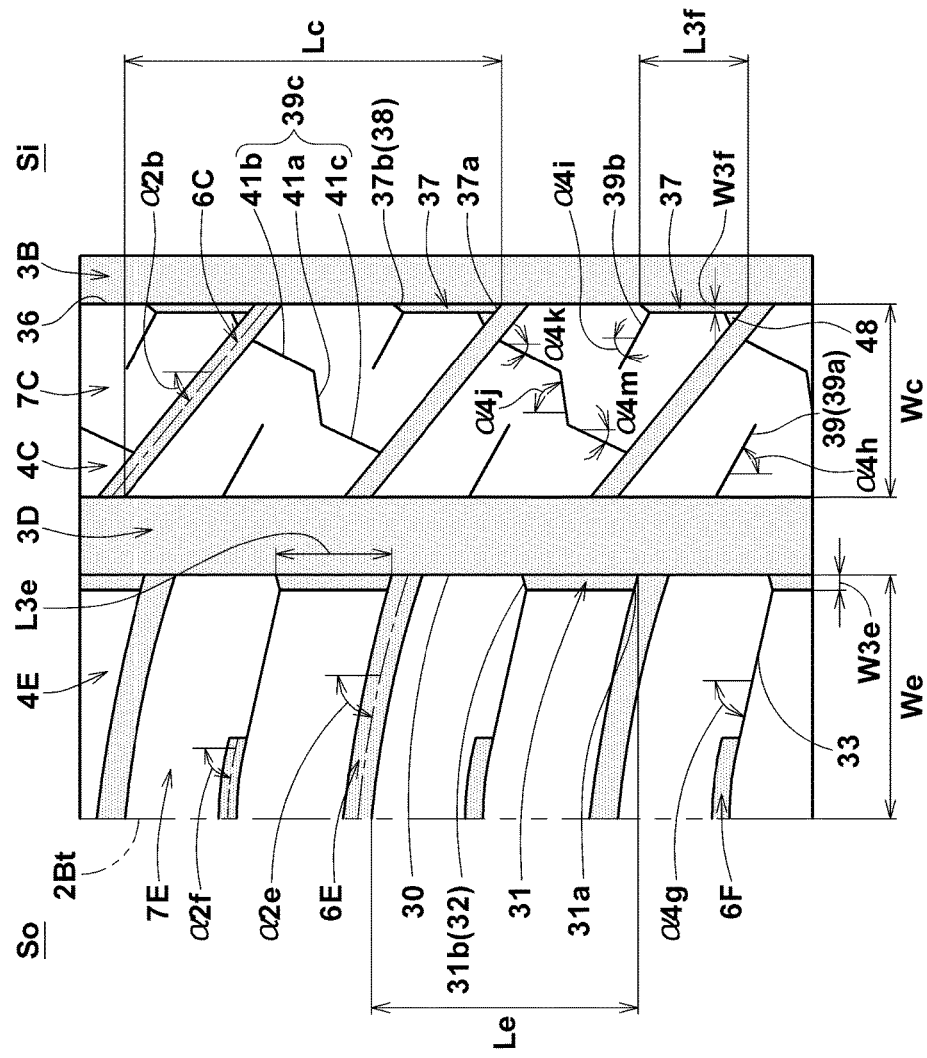
FIG. 6 is a magnified view of the second shoulder land region and a second middle land region.

FIG. 6 shows the second shoulder land region 4E and the second middle land region 4C.

The second shoulder transverse groove 6E is inclined with respect to the tire axial direction. The second shoulder transverse groove 6E configured as such can provide an axial edge component and a circumferential edge component in a good balance, therefore, it is possible to improve the on-snow performance.

Further, the angle α2e of the second shoulder transverse groove 6E with respect to the tire circumferential direction is gradually increased from the second shoulder main groove 3D toward the second tread edge 3Bt. The second shoulder transverse groove 6E configured as such can smoothly drain the water film on a road surface.

In order to exert these effects efficiently, it is preferred that the groove width W2e (shown in FIG. 1), the maximum groove depth D2e (shown in FIG. 2), and the angle α2e (shown in FIG. 6) with respect to the tire circumferential direction of the second shoulder transverse groove 6E are set in the same ranges as for the groove width W2d, the maximum groove depth D2d and the angle α2d of the first shoulder transverse groove 6D, respectively.

As shown in FIG. 6, the second shoulder block 7E is configured so that the maximum circumferential length Le thereof is approximately the same as the maximum axial width We thereof, and formed in the form of a parallelogram in the plan view.

The second shoulder block 7E configured as such can improve its rigidity in the tire circumferential direction and the tire axial direction in a good balance, therefore, it is possible to improve the running performance on snowy roads and dry roads. Preferably, the maximum length Le and the maximum width We of the second shoulder block 7E are set to be approximately 15% to 20% of the tread width TW.

The second shoulder blocks 7E are each provided with a second shoulder chamfer portion 31 at the corner 30 between the ground contacting surface of the second shoulder block 7E and the adjacent groove side wall of the second shoulder main groove 3D. The second shoulder chamfer portion 31 has a slope face similarly to that shown in FIG. 4.

The second shoulder chamfer portion 31 configured as such can increase the circumferential edge component in the second shoulder block 7E, therefore, it is possible to improve the on-snow performance. Further, the second shoulder chamfer portion 31 can partially decrease the ground contacting area of the second shoulder block 7E, therefore, it is possible to improve the wet performance.

In this embodiment, one end 31a in the tire circumferential direction of the second shoulder chamfer portion 31 is connected to one of the adjacent second shoulder transverse grooves 6E, but the other end 31b in the tire circumferential direction of the second shoulder chamfer portion 31 terminates without reaching the second shoulder transverse grooves 6E. Thereby, an step surface 32 extending in the tire axial direction is formed at the other end 31b of the second shoulder chamfer portion 31.

The step surface 32 can provide an axial edge component and scratch the snow in the tire circumferential direction, therefore, it is possible to improve the on-snow performance.

Further, when the tire is mounted on a vehicle so that the second half-tread portion 2B is located toward the outside So as in this embodiment, the ground contact pressure of the second shoulder block 7E becomes larger during cornering. The second shoulder chamfer portions 31 provided in the second shoulder block 7E like this can scratch the snow effectively during cornering, therefore, it is possible to greatly improve the on-snow performance.

In this embodiment, the step surface 32 is formed as a triangle tapered toward the inside in the tire radial direction as with the step surface 11 shown in FIG. 4. Thereby, it is possible to suppress the decrease in the rigidity of the second shoulder block 7E and maintain the running performance on dry roads.

Further, the other end 31b of the second shoulder chamfer portion 31 is formed as a tapered shape in plan view.

The second shoulder chamfer portion 31 configured as such can alleviate a stepped rigidity change from the corner portion 30 adjacent thereto in the tire circumferential direction, therefore, it is possible to prevent the decrease of the steering stability.

The width W3e, the depth and the circumferential length L3e of the second shoulder chamfer portion 31 in this embodiment are set in the same ranges as for the width W3b, the depth D3b and the length L3b of the first middle chamfer portion 15, respectively.

As shown in FIG. 1, the second shoulder blocks 7E are each provided with a second shoulder rug groove 6F extending axially inwardly from the second tread edge 2Bt and terminating without reaching the second shoulder main groove 3D.

The second shoulder rug groove 6F configured as such can improve the on-snow performance and the wet performance.

Moreover, the second shoulder rug groove 6F can suppress the decrease in the rigidity of the second shoulder block 7E, therefore, it is possible to improve the running performance on dry roads.

In order to exert these effects efficiently, it is preferred that the groove width W2f (shown in FIG. 1), and the groove depth of the second shoulder rug groove 6F are set in the same ranges as for the groove width W2b and the groove depth D2b of the first middle rug groove 6B, respectively.

Preferably, the angle α2f (shown in FIG. 6) of the second shoulder rug groove 6F with respect to the tire circumferential direction is set in the same range as for the angle α2e of the second shoulder transverse groove 6E.

The second shoulder blocks 7E are each provided with a second shoulder sipe 33 extending axially outwardly from the second shoulder main groove 3D.

The second shoulder sipe 33 in this embodiment extends axially outwardly from the end portion (the other end 31b) of the second shoulder chamfer portion 31.

The second shoulder sipe 33 configured as such can provide the edges for the second shoulder block 7E, therefore, it is possible to improve the on-ice performance. Moreover, the second shoulder sipe 33 co-operates with the step surface 32 of the second shoulder chamfer portion 31 and can provide an axial edge component, therefore, it is possible to improve the on-snow performance and the on-ice performance.

The second shoulder sipe 33 is formed as an open sipe extending from the second shoulder main groove 3D (the other end 31b of the second shoulder chamfer portion 31) to the second shoulder rug groove 6F. Thereby, the second shoulder sipe 33 can provide the axial edge component over the wide range of the second shoulder block 7E in the tire axial direction, therefore, it is possible to improve the on-ice performance.

The angle α4g of the second shoulder sipe 33 with respect to the tire circumferential direction is approximately the same as the angle α2e of the second shoulder transverse groove 6E so that the second shoulder sipe 33 and the second shoulder transverse groove 6E are inclined substantially in parallel with each other.

The second shoulder sipe 33 configured as such can provide a circumferential edge component and an axial edge component for the second shoulder block 7E, therefore, it is possible to further improve the on-ice performance.

In order to exert these effects efficiently, it is preferred that the width and the depth of the second shoulder sipe 33 are set in the same ranges as for the width and the depth of the first shoulder sipe 12a, respectively.

As shown in FIG. 1, the second middle land region 4C is provided with second middle transverse grooves 6C extending from the second shoulder main groove 3D to the second center main groove 3B. Thereby, the second middle land region 4C is circumferentially divided into second middle blocks 7C.

The second middle transverse groove 6C configured as such can improve the on-snow performance and the wet performance.

The second middle transverse groove 6C is inclined with respect to the tire axial direction. The second middle transverse groove 6C configured as such can provide a circumferential edge component and an axial edge component in a good balance, therefore, it is possible to improve the on-snow performance.

In order to exert these effects efficiently, it is preferred that the groove width W2c and the maximum groove depth D2c (shown in FIG. 2) of the second middle transverse groove 6C are set in the same ranges as for the groove width W2b and the maximum groove depth D2b of the first middle rug groove 6B.

Preferably, the angle α2b (shown in FIG. 6) of the second middle transverse groove 6C with respect to the tire circumferential direction is set in a range from 45 to 60 degrees.

As shown in FIG. 6, the second middle block 7C is configured such that the a maximum circumferential length Lc thereof is larger than the maximum axial width Wc thereof and formed as a parallelogram in the plan view. The second middle block 7C configured as such can relatively increase its rigidity in the tire circumferential direction, therefore, it is possible to improve the running performance on snowy roads and dry roads.

Preferably, the maximum length Lc of the second middle block 7C is approximately 22% to 27% of the tread width.

Preferably, the maximum width Wc of the second middle block 7C is approximately 12% to 17% of the tread edge TW.

The second middle block 7C has an edge abutting on the second middle transverse groove 6C and an edge abutting on the second center main groove 3B, and an acute angled corner 48 formed between these edges is cambered. By the chamfer, the corner 48 on the second center main groove 3B side where the ground contact pressure becomes relatively high during straight running and cornering can be prevented from becoming a start point from which a tearing-off of the block occurs.

Further, the second middle blocks 7C are each provided with a second middle chamfer portion 37 at the corner 36 between the ground contacting surface of the second middle block 7C and the adjacent groove side wall of the second center main groove 3B. The second middle chamfer portion 37 has a slope face as with the first shoulder chamfer portion 10 shown in FIG. 4. The second middle chamfer portion 37 configured as such can increase the circumferential edge component of the second middle block 7C, therefore, it is possible to improve the on-snow performance. Further, the second middle chamfer portion 37 can partially decrease the ground contacting area of the second middle block 7C, therefore, it is possible to improve the wet performance.

In this embodiment, the second middle chamfer portion 37 is configured such that one end 37a thereof in the tire circumferential direction is connected to one of the adjacent second middle transverse grooves 6C, and the other end 37b thereof in the tire circumferential direction terminates without reaching the other second middle transverse groove 6C. Thereby, a step surface 38 extending in the tire axial direction is formed at the other end 37b of the second middle chamfer portion 37.

The step surface 38 configured as such can provide an axial edge component and scratch the snow in the tire circumferential direction, therefore, it is possible to improve the on-snow performance.

Further, the step surface 38 in this embodiment is formed as a triangle tapered toward the inside in the tire radial direction as with the step surface 11 shown in FIG. 4. Thereby, the second middle chamfer portion 37 can suppress the decrease in the rigidity of the second middle block 7C and maintain the running performance on dry roads.

The other end 37b of the second middle chamfer portion 37 is formed as a tapered shape in the plan view. The second middle chamfer portion 37 configured as such can alleviate a stepped rigidity change from the corner portion 36 adjacent thereto in the tire circumferential direction, therefore, it is possible to prevent the decrease in the steering stability.

Preferably, the width W3f, the depth, and the circumferential length L3f of the second middle chamfer portion 37 in this embodiment are set in the same ranges as for the width W3a, the depth D3a, and the length L3a of the first shoulder chamfer portion 10, respectively. Thereby, the width W3f and the depth of the second middle chamfer portion 37 are set to be smaller than the width W3b and the depth D3b of the first middle chamfer portion 15, therefore, it is possible to suppress the decrease in the rigidity of the second middle block 7C and maintain the running performance on dry roads.

The second middle blocks 7C are each provided with second middle Sipes 39 to provide edges for the second middle block 7C, therefore, it is possible to improve the on-ice performance. Preferably, the width and the depth of the second middle sipe 39 are set in the same ranges as for the width and the depth of the first shoulder sipe 12a, respectively.

In this embodiment, the second middle sipes 39 include a second outside middle sipe 39a connected to the second shoulder main groove 3D, a second inside middle sipe 39b connected to the second center main groove 3B, and a second center middle sipe 39c extending between the adjacent second middle transverse grooves 6C.

The second outside middle sipe 39a extends axially inwardly from the second shoulder main groove 3D and terminates without reaching the second center main groove 3B. The second outside middle sipe 39a configured as such can provide edges, while maintain the rigidity of the second middle block 7C.

Further, the second outside middle sipe 39a is inclined with respect to the tire circumferential direction. Thereby, the second outside middle sipe 39a can thoroughly provide a circumferential edge component and an axial edge component.

It is preferable that the angle α4h of the second outside middle sipe 39a with respect to the tire circumferential direction is set in a range from 45 to 65 degrees.

The second inside middle sipe 39b extends axially outwardly from an end (the other end 37b) of the second middle chamfer portion 37 and terminates without reaching the second shoulder main groove 3D. The second inside middle sipe 39b configured as such can suppress the decrease in the rigidity of the second middle block 7C, while providing edge components for the second middle block 7C. Further, the second inside middle sipe 39b co-operates with the step surface 38 of the second middle chamfer portion 37 and can provide an axial edge component, therefore, it is possible to improve the on-snow performance and the on-ice performance.

Further, the second inside middle sipe 39b is inclined with respect to the tire circumferential direction. Thereby, the second inside middle sipe 39b can thoroughly provide a circumferential edge component and an axial edge component.

Preferably, an angle α4i of the second inside middle sipe 39b with respect to the tire circumferential direction is set in the same range as for the angle α4h of the second outside middle sipe 39a.

The second center middle sipe 39c is composed of a center portion 41a, an inside portion 41b and an outside portion 41c. The center portion 41a extends straight along the tire axial direction in the central portion in the tire axial direction of the second middle block 7C, and terminates without reaching the second shoulder main groove 3D and the second center main groove 3B.

The inside portion 41b extends from the axially inner end of the center portion 41a to one of the adjacent second middle transverse grooves 6C, and the outside portion 41c extends from the axially outer end of the center portion 41a to the other second middle transverse groove 6C.

The second center middle sipe 39c configured as such can provide the axial and circumferential edge components for the second middle block 7C over the wide range in the tire circumferential direction, therefore, it is possible to improve the on-ice performance.

The angle α4k of the inside portion 41b with respect to the tire circumferential direction, and the angle α4m of the outside portion 41c with respect to the tire circumferential direction are set to be smaller than the angle α4j of the center portion 41a with respect to the tire circumferential direction.

Thereby, the second center middle sipe 39c is configured to be bended to form a crank shape, therefore, it is possible to provide the axial and circumferential edge components thoroughly in the tire circumferential direction and the tire axial direction.

It is desirable that the angle α4k of the inside portion 41b and the angle α4m of the outside portion 41c are set in a range from be 15 to 35 degrees.

It is desirable that the angle α4j of the center portion 41a is set in a range from 70 to 90 degrees.

The second center land subsection 4Ab between the second center main groove 3B and the center sub groove 5A is applied by a relatively large load during straight running. Thus, as shown in FIG. 5, the second center land subsection 4Ab is formed as a rib body extending continuously in the tire circumferential direction to ensure a high rigidity, therefore, it is possible to improve the steering stability on dry roads.

Preferably, the maximum width Wi of the second center land subsection 4Ab is set in the same range as for the maximum width Wh of the first center land subsection 4Aa.

In this embodiment, the second center land subsection 4Ab is provided with second center chamfer portions 45 at the corner 43 between the ground contacting surface of the second center land subsection 4Ab and the adjacent groove side wall of the second center main groove 3B. The second center chamfer portion 45 has a slope face as with the first shoulder chamfer portion 10 shown in FIG. 4. In this embodiment, the second center chamfer portions 45 are provided and arranged in the tire circumferential direction with substantially the same pitches as the first center chamfer portion 27.

The second center chamfer portion 45 configured as such can increase the circumferential edge component of the second center land subsection 4Ab, therefore, it is possible to improve the on-snow performance. Further, the second center chamfer portion 45 can partially decrease the ground contacting area of the second center land subsection 4Ab, therefore, it is possible to improve the wet performance.

Both ends 45t in the tire circumferential direction of the second center chamfer portion 45 terminate within the second center land subsection 4Ab. Thereby, step surfaces 46 extending in the tire axial direction are formed at the both ends 45t of the second center chamfer portion 45. The step surfaces 46 configured as such provide an axial edge component and can scratch the snow in the tire circumferential direction, therefore, it is possible to improve the on-snow performance.

Further, the step surface 46 in this embodiment is formed as a triangle tapered toward the inside in the tire radial direction as with the step surface 11 shown in FIG. 4. Thereby, it is possible to maintain the rigidity in the second center chamfer portion 45, therefore, it is possible to maintain the running performance on dry roads.

The both ends 45t of the second center chamfer portion 45 are each formed as a tapered shape in the plan view. The second chamfer portion 45 configured as such can alleviate a stepped rigidity change from non-chamfered corner portions 43 on both sides of the second center chamfer portion 45 in the tire circumferential direction, therefore, it is possible to prevent the decrease in the steering stability.

Preferably, the width W3g and the depth of the second center chamfer portion 45 in this embodiment are set in the same ranges as for the width W3d and the depth of the first center chamfer portion 27.

The length L3g (shown in FIG. 5) in the tire circumferential direction of the second center chamfer portion 45 is set to be smaller than the length L3e of the second shoulder chamfer portion 31 and the length L3f of the second middle chamfer portion 37 shown in FIG. 6.

Thereby, the second center chamfer portion 45 can prevent the decrease in the rigidity of the center land region 4A to which relatively large ground contacting pressure is applied during straight running, therefore, it is possible to improve the running performance on dry roads.

It is preferable that the length L3g of the second center chamfer portion 45 is set in the same range as for the length L3d of the first center chamfer portion 27.

The second center chamfer portions 45 are sifted in the tire circumferential direction from the second middle chamfer portions 37. Thereby, the second center chamfer portions 45 and the second middle chamfer portions 37 can provide the edge components thoroughly in the tire circumferential direction on both sides of the second center main groove 3B.

Further, the second center chamfer portions 45 are shifted in the tire circumferential direction from the first center chamfer portions 27. Thereby, the second center chamfer portions 45 and the first center chamfer portions 27 can provide the edge components thoroughly in the tire circumferential direction on both sides of the second center main groove 3B.

The second center land subsection 4Ab in this embodiment is provided with second center sipes 47 extending axially inwardly from the second center main groove 3B (the second center chamfer portion 45). The second center sipe 47 configured as such can provide the edges for the second center land subsection 4Ab, therefore, it is possible to improve the on-ice performance.

Further, the second center sipe 47 in this embodiment is formed as a semi-open sipe connected only with the second center main groove 3B (the second center chamfer portion 45). Thereby, the second center sipe 47 can maintain the rigidity of the second center land subsection 4Ab, therefore, it is possible to maintain the running performance on dry roads.

The second center sipe 47 in this embodiment extends with an inclination with respect to the tire axial direction to provide a circumferential edge component and an axial edge component.

Moreover, the second center sipe 47 is inclined to the opposite direction to the second inside middle sipe 39b adjacent thereto with the second center main groove 3B therebetween. Thereby, the second center sipe 47 can provide axial and circumferential edge components differently from those provided by the second inside middle sipe 39b, therefore, it is possible to improve the on-ice performance.

The second center sipes 47 in this embodiment include second center short sipes 47a and second center long sipes 47b arranged alternately in the tire circumferential direction. The second center short sipes 47a are connected to the respective second center chamfer portions 45, and the second center long sipes 47b are connected to the second center main groove 3B between the second center chamfer portions 45.

The second center short sipes 47a and the second center long sipes 47b can provide the edges for the second center land subsection 4Ab thoroughly in the tire circumferential direction, therefore, it is possible to greatly improve the on-ice performance.

In order to exert these effects efficiently, it is preferred that the width, the depth and the angle $\alpha 4n$ with respect to the tire circumferential direction of the second center sipe 47 (the second center short sipe 47a and the second center long sipe 47b) are set in the same ranges as for the width, the depth and the angle $\alpha 4f$ of the first center sipe 29, respectively.

In the above-described embodiment, the tread pattern is bound with the tire mounting position such that, when the tire is mounted on a vehicle, the first half-tread portion 2A is located toward the inside Si of the vehicle and the second half-tread portion 2B is located toward the outside So of the vehicle. However, the present invention is not limited to the illustrated embodiment. The present invention can be embodied such that, when the tire is mounted on a vehicle, the first half-tread portion 2A is located toward the outside of the vehicle and the second half-tread portion 2B is located toward the inside of the vehicle, for example.

In this case, the first middle chamfer portions 15 and the first shoulder chamfer portions 10 are provided in the first middle land region 4B and the first shoulder land region 4D to which a relatively large ground contact pressure is applied during cornering, therefore, it is possible to scratch the snow efficiently during cornering.

Further, the first middle chamfer portions 15 and the first shoulder chamfer portions 10 co-operate to scratch the snow during running straight when relatively small ground contacting pressure is applied to the first middle land region 4B and the first shoulder land region 4D.

Therefore, the tire 1 of the present invention can improve the on-snow performance efficiently.

While detailed description has been made of an especially preferable embodiment of the present invention, the present invention can be embodied in various forms without being limited to the illustrated embodiment.

WORKING EXAMPLES

Based on the tread pattern shown in FIG. 1, test tires as working examples Ex.1 to Ex.8 having specifications listed in Table 1 were manufactured.

Figure 7A:
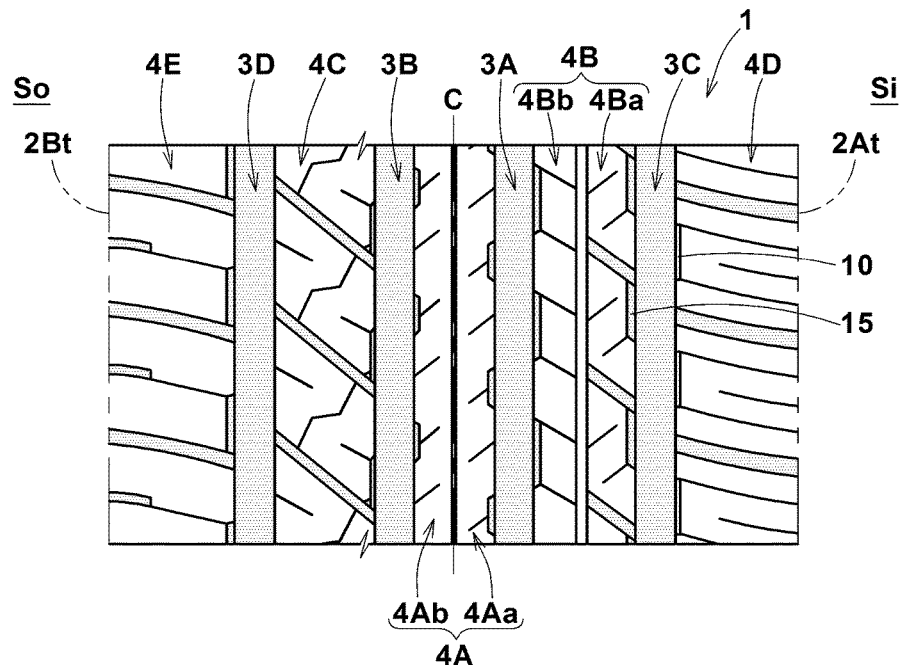
FIG. 7(a) is a developed view of the tread portion of Comparative example 1.
Figure 7B:
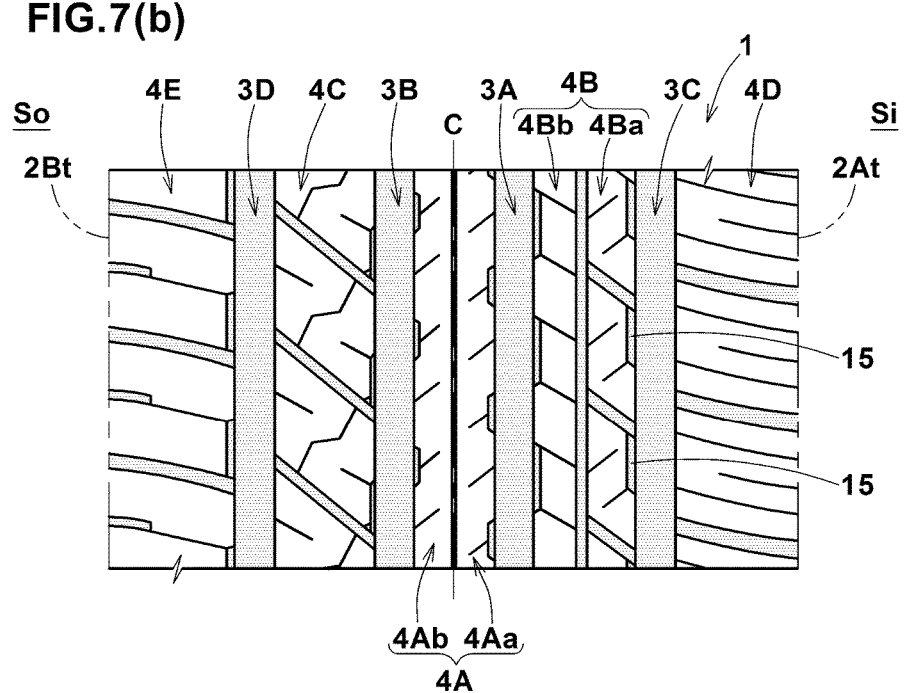
FIG. 7(b) is a developed view of the tread portion of Comparative example 2.

For comparison, a test tire as Comparative example Ref. 1 having a tread pattern shown in FIG. 7(a) with the first middle chamfer portions shifted from the first shoulder chamfer portions, and a test tire as Comparative example Ref. 2 having a tread pattern shown in FIG. 7(b) without the first shoulder chamfer portions were also manufactured.

The sizes of the other components than the components listed in Table 1 and the common specification listed below were the same as those illustrated in the above "Description of the Preferred Embodiments" and the Figures.

Common Specification:
Tire size: 225/55R18 98H
Rim size: 18×7.5 J
Test car: 2000 cc 4WD passenger car
Camber angle: −2 degrees
Tire pressure:
   Front: 230 kPa
   Rear: 220 kPa
Tread width TW: 198 mm
First shoulder block:
   Maximum length Ld/TW: 17.9%
   Maximum width Wd/TW: 18.5%
First outside middle block
   Maximum length Lf/TW: 25.6%
   Maximum width Wf/TW: 14.7%
First inside middle land region:
   Maximum width Wg/TW: 6.4%
First center land region, Second center land region:
   Maximum width Wh/TW, W1/TW: 5.8%
Second shoulder block:
   Maximum length Le/TW: 19.2%
   Maximum width We/TW: 17.9%
First shoulder main groove:
   Groove width W1c/TW: 5.1%
   Groove depth D1c/TW: 5.2%
Second shoulder main groove:
   Groove width W1d/TW: 5.8%
   Groove depth D1d/TW: 5.2%
First center main groove, Second center main groove:
   Groove width W1b/TW, W1c/TW: 5.1%

Groove depth D1a/TW, D1b/TW: 5.2%
First center sub groove:
  Groove width W1e/TW: 0.6%
  Groove depth D1e/TW: 1.5%
First middle sub groove:
  Groove width W1f/TW: 1.9%
  Groove depth D1a/TW: 2.3%
First shoulder transverse groove, Second shoulder transverse groove:
  Groove width W2d/TW, W2e/TW: 2.3%
  Groove depth D2d/TW, D2e/TW: 3.3%
  Angle α2d, α2e: 70-90 degrees
First middle rug groove, Second middle transverse groove:
  Groove width W2b/TW, W2c/TW: 2.1%
  Groove depth D2b/TW, D2c/TW: 2.9%
  Angle α2b, α2c: 55 degrees
Second shoulder rug groove:
  Groove width W2f/TW: 2.1%
  Groove depth D2f/TW: 2.9%
  Angle α2f: 80-90 degrees
First shoulder chamfer portion:
  Width W3a: 1.3 mm
  Depth D3a/D1a: 87%
  Length D3a/Maximum length Ld: 46%
First middle chamfer portion:
  Width W3b/width W3a: 1.8
  Depth D3b/depth D3a: 1.8
  Length L3b/maximum length Lb: 43%
First inside middle chamfer portion:
  Width W3c: same as width W3b
  Depth: same as depth D3b
  Length L3c: same as length L3b
First center chamfer portion:
  Width W3d: same as width W3a
  Depth: same as depth D3a
  Length L3d: 66.7% of length L3a
Second shoulder chamfer portion:
  Width W3e: same as width W3b
  Depth: same as depth D3b
  Length L3e: same as length L3b
Second middle chamfer portion:
  Width W3f: same as width W3a
  Depth: same as depth D3a
  Length L3f: same as length L3a
Second center chamfer portion:
  Width W3g: same as width W3d
  Depth: same as depth D3a
  Length L3g: same as length L3d
Each sipe
  Width: 0.8 mm, depth: 2.5 mm First shoulder sipe, First center shoulder sipe, Second shoulder sipe:
  Angle α4a, α4ab, α4g: 70-90 degrees
First outside middle sipe, First center middle sipe:
  Angle α4c, α4d: 50 degrees
First inside middle sipe:
  Angle α4e: 60 degree
First center sipe, Second center sipe:
  Angle α4f, α4n: 55 degrees
Second outside middle sipe, Second inside middle sipe, Second outside middle sipe:
  Angle α4i, α4h: 55 degrees
Second center middle sipe:
  Angle α4j of Center portion: 75 degrees
  Angle α4k of Inside portion: 25 degrees
  Angle α4m of Outside portion: 25 degrees
The test tires were tested as follows.

<On-Snow Performance>
Test tires were mounted on all of the wheels of the test car. Then, during the test car running on a road surface covered with snow (not compressed snow) of a test course, the test driver evaluated the on-snow performance based on the steering response, rigid impression, grip and the like.
The results are indicated by an index based on Working example Ex. 1 being 100, wherein the larger numeric value is better.

<On-Ice Performance>
The test car was driven on a road surface covered with ice of the test course, and the driver evaluated the on-ice performance based on the steering response, rigid impression, grip and the like.
The results are indicated by an index based on working example Ex. 1 being 100, wherein the larger numeric value is better.

<Running Performance on Dry Road>
The test car was driven on a dry asphalt road surface of a test course, and the test driver evaluated the running performance based on the steering response, rigid impression, grip and the like.
The results are indicated by an index based on working example Ex. 1 being 100, wherein the larger numeric value is better.

<Wet Performance>
The test car was driven at a speed of 65 km/h on a wet asphalt road surface covered with 0.5 to 2.0 mm depth water, and the brakes were applied while driving, then the distance needed for the test car speed to decrease from 60 km/h to 20 km/h was measured. The results are indicated by an index based on working example Ex. 1 being 100, wherein the larger numeric value is better.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Developed view of Tread portion | FIG. 7(a) | FIG. 7(b) | FIG. 7(a) | FIG. 7(a) | FIG. 7(a) | FIG. 7(a) | FIG. 7(a) | FIG. 7(a) | FIG. 7(a) | FIG. 7(a) |
| Position of First tread portion (Inside or Outside of vehicle) | Inside | Inside | Outside | Inside | Inside | Inside | Inside | Inside | Inside | Inside |
| Overlapping length L4 of Chamfer portion/Length L3 of First middle chamfer portion (%) | — | — | 60.0 | 60.0 | 80.0 | 100.0 | 100.0 | 100.0 | 100.0 | 100.0 |
| Inclination direction of First inside middle sipe (*1) | Opposite | Opposite | Opposite | Opposite | Opposite | Opposite | Same | Same | Same | Same |
| Presence or Absence of Connection of First outside middle sipe with end of | absence | absence | absence | absence | absence | absence | absence | presence | presence | presence |

TABLE 1-continued

| | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| First middle chamfer portion Presence or Absence of a pair of First shoulder sipes | absence | absence | absence | absence | absence | absence | absence | absence | presence | presence |
| Presence or Absence of second shoulder chamfer portion | absence | absence | absence | absence | absence | absence | absence | absence | absence | presence |
| On-snow performance | 95 | 85 | 100 | 105 | 110 | 115 | 115 | 120 | 120 | 125 |
| On-ice performance | 100 | 100 | 100 | 100 | 100 | 100 | 100 | 105 | 110 | 110 |
| Running performance on dry road surface | 100 | 105 | 100 | 100 | 100 | 100 | 100 | 98 | 98 | 98 |
| Wet performance | 100 | 95 | 100 | 100 | 100 | 100 | 100 | 100 | 100 | 105 |

(*1) Same: Same direction as First middle rug groove, Opposite: Opposite direction to First middle rug groove From the test results, it was confirmed that the tires as the working examples were capable of improving the on-snow performance compared with the tires as the comparative examples. Further, it was confirmed that the tires as the working examples were capable of improving the wet performance compared with the tires as the comparative examples.

REFERENCE SIGNS LIST 4B first middle land region
4D first shoulder land region
6B first middle rug groove
7D first shoulder block
10 first shoulder chamfer portion
15 first middle chamfer portion

The invention claimed is:

1. A tire comprising
a tread portion having a first half-tread portion located on one side of the tire equator in the tire axial direction and an second half-tread portion on the other side of the tire equator in the tire axial direction,
the first half-tread portion provided with
a first shoulder main groove extending continuously in the tire circumferential direction on its most tread-edge side,
a first shoulder land region provided axially outside the first shoulder main groove, and
a first middle land region provided axially inside the first shoulder main groove,
wherein
the first shoulder land region is circumferentially divided into first shoulder blocks by first shoulder transverse grooves extending from the first shoulder main groove to a tread edge,
each of the first shoulder blocks has a first shoulder chamfer portion at a corner between a ground contacting surface of the first shoulder block and a groove side wall of the first shoulder main groove,
both ends in the tire circumferential direction of the first shoulder chamfer portion terminate without being connected to the first shoulder transverse grooves,
the first middle land region is provided with
first middle rug grooves extending axially inwardly from the first shoulder main groove and terminating within the first middle land region, and
first middle chamfer portions each formed at a corner between a ground contacting surface of the first middle land portion and a groove side wall of the first shoulder main groove in a part of the range between a pair of the first middle rug grooves adjacent in the tire circumferential direction, and the first middle chamfer portions are disposed so as to overlap in the tire circumferential direction with the first shoulder chamfer portions of the first shoulder blocks.

2. The tire according to claim 1, wherein
the first middle land region is provided with first inside middle sipes extending axially inwardly from positions axially inside the first middle rug grooves, and
the first inside middle sipes are inclined to the same direction as the first middle rug grooves.

3. The tire according to claim 1, wherein
the first middle land region is provided with first outside middle sipes extending axially inwardly from the first shoulder main groove, and each disposed between a pair of the first middle rug grooves adjacent in the tire circumferential direction, and further each connected to an end in the tire circumferential direction of one of the first middle chamfer portions.

4. The tire according to claim 1, wherein
the first shoulder block is provided with a pair of first shoulder sipes extending axially outwardly from said both ends of the first shoulder chamfer portion.

5. The tire according to claim 1, wherein
the second half-tread portion is provided with
a second shoulder main groove extending continuously in the tire circumferential direction on its most tread-edge side, and
a second shoulder land region formed axially outside the second shoulder main groove,
the second shoulder land region is circumferentially divided into second shoulder blocks by second shoulder transverse grooves extending from the second shoulder main groove to the adjacent tread edge, and
each of the second shoulder blocks is provided with a second shoulder chamfer portion at a corner between a ground contacting surface of the second shoulder block and the adjacent side wall of the second shoulder main groove in a part of the range between a pair of the second shoulder transverse grooves adjacent in the tire circumferential direction.

6. The tire according to claim 5, wherein
the second shoulder block is provided with a second shoulder sipe extending axially outwardly from the second shoulder main groove, and
the second chamfer portion extends in the tire circumferential direction from the second shoulder sipe to one of said pair of the second shoulder transverse grooves adjacent in the tire circumferential direction.

7. The tire according to claim 1, wherein
the tread portion is provided with a tread pattern whose position when the tire is mounted on a vehicle is specified such that the first half-tread portion and the second half-tread portion are respectively located toward the inside and outside of the vehicle.

8. The tire according to claim 1, wherein
the first shoulder land region is defined between the first shoulder main groove and the adjacent tread edge,
a first center main groove extending continuously in the tire circumferential direction is disposed between the first shoulder main groove and the tire equator,
the first middle land region is defined between the first center main groove and the first shoulder main groove,
the second half-tread portion is provided with
a second shoulder main groove extending continuously in the tire circumferential direction,
a second center main groove extending continuously in the tire circumferential direction between the second shoulder main groove and the tire equator,
a second shoulder land region defined between the second shoulder main groove and the adjacent tread edge, and
a second middle land region defined between the second shoulder main groove and the second center main groove,
the tread portion is provided with a center land region defined between the first center main groove and second center main groove,
in a ground contacting patch of the tire under its normally inflated normally loaded state, a maximum axial width Wa of the center land region,
a maximum axial width Wb of the first middle land region,
a maximum axial width Wc of the second middle land region,
a maximum axial width Wd of the first shoulder land region, and
a maximum axial width We of the second shoulder land region
satisfy the following relationship:

$$Wa<Wb<Wc<Wd<We.$$

9. The tire according to claim 1, wherein
each of the first shoulder blocks is provided with
a pair of first shoulder sipes extending axially outwardly from both ends of the first shoulder chamfer portion, and
a first center shoulder sipe disposed between the first shoulder sipes and extending in the tire axial direction.

10. The tire according to claim 1, wherein
the first middle land region is provided in the widthwise center thereof with a first middle sub groove extending continuously in the tire circumferential direction.

11. The tire according to claim 10, wherein
the groove width of the first middle sub groove is smaller than that of the first center main groove, and
the groove depth of the first middle sub groove is smaller than that of the first center main groove.

* * * * *